(12) United States Patent
Nakayasu

(10) Patent No.: US 7,941,487 B2
(45) Date of Patent: May 10, 2011

(54) APPARATUS, SYSTEM, AND METHOD OF ELECTRONIC MAIL PROCESSING

(75) Inventor: Tetsuyuki Nakayasu, Osaka (JP)

(73) Assignee: Panasonic Corporation, Osaka (JP)

( * ) Notice: Subject to any disclaimer, the term of this patent is extended or adjusted under 35 U.S.C. 154(b) by 716 days.

(21) Appl. No.: 10/584,062

(22) PCT Filed: Dec. 24, 2004

(86) PCT No.: PCT/JP2004/019728
§ 371 (c)(1),
(2), (4) Date: Jun. 22, 2006

(87) PCT Pub. No.: WO2005/064512
PCT Pub. Date: Jul. 14, 2005

(65) Prior Publication Data
US 2007/0124787 A1 May 31, 2007

(30) Foreign Application Priority Data

Dec. 25, 2003 (JP) ................................. 2003-429445

(51) Int. Cl.
*G06F 15/16* (2006.01)

(52) U.S. Cl. ........ 709/206; 715/751; 715/853; 715/756; 715/723; 715/719; 386/248; 386/260; 386/262; 386/206

(58) Field of Classification Search .................. 709/246, 709/200, 201–206; 715/51, 201, 230–242, 715/719–726, 751–759, 865–866, 853–855; 386/68, 219, 241, 248, 262, 278, 329–331, 386/343–348; 707/608, 614, 694
See application file for complete search history.

(56) References Cited

U.S. PATENT DOCUMENTS

| | | | | |
|---|---|---|---|---|
| 5,687,275 A | * | 11/1997 | Lane et al. | 386/343 |
| 5,781,186 A | * | 7/1998 | Jennings | 715/202 |
| 6,064,794 A | * | 5/2000 | McLaren et al. | 386/68 |
| 6,484,156 B1 | * | 11/2002 | Gupta et al. | 707/802 |
| 6,748,421 B1 | * | 6/2004 | Ozkan et al. | 709/206 |

(Continued)

FOREIGN PATENT DOCUMENTS

| | | |
|---|---|---|
| EP | 1 154 647 | 11/2001 |
| JP | 2000-209347 | 7/2000 |

OTHER PUBLICATIONS

B. Kervella et al., "*Towards a Complete Multimedia Mail: Use of MHEG in Standard Messaging Systems*", Multimedia Transport and Teleservices, International Cost 237, Workshop Proceedings, Vienna, Nov. 13-15, 1994, Berlin, Springer, DE, Nov. 13, 1995, pp. 1-13, XP000585291.

(Continued)

*Primary Examiner* — Greg Bengzon
(74) *Attorney, Agent, or Firm* — Wenderoth, Lind & Ponack, L.L.P.

(57) ABSTRACT

An electronic mail processing apparatus includes a data receiving section (101) that receives mail data including video data or audio data, a cited data detecting section (103) that detects a cited part of the received video data or audio data as cited data from the mail data received by the data receiving section, and a reproduction control section (104) that controls a reproducing method of the received mail data. The reproduction control section (104) controls the reproduction method so that a reproduction method (for example, reproduction speed) for the cited data is deferent from a reproduction method for data other than the cited data in the received mail data.

11 Claims, 5 Drawing Sheets

U.S. PATENT DOCUMENTS

| | | | |
|---|---|---|---|
| 6,917,965 B2 * | 7/2005 | Gupta et al. | 709/206 |
| 6,961,446 B2 * | 11/2005 | Imagawa et al. | 382/103 |
| 7,453,472 B2 * | 11/2008 | Goede et al. | 345/634 |
| 7,620,648 B2 * | 11/2009 | Cragun et al. | 1/1 |
| 7,647,349 B2 * | 1/2010 | Hubert et al. | 707/999.107 |
| 2004/0010629 A1 * | 1/2004 | Diesel et al. | 709/250 |
| 2004/0221062 A1 * | 11/2004 | Starbuck et al. | 709/246 |
| 2005/0081159 A1 * | 4/2005 | Gupta et al. | 715/751 |
| 2007/0044010 A1 * | 2/2007 | Sull et al. | 715/500.1 |
| 2009/0228126 A1 * | 9/2009 | Spielberg et al. | 700/94 |

OTHER PUBLICATIONS

S. Foo et al., "*Delivery of Video Mail on the World Wide Web*", Journal of Network and Computer Applications, Academic Press, New York, NY., US, vol. 20, No. 4, 1997, pp. 389-403, XP000913850.

P. England et al., "*RAVE: Real-Time Services for the Web*", Computer Networks and ISDN Systems, North Holland Publishing, Amsterdam, NL, vol. 28, No. 11, May 1996, pp. 1547-1558, XP004018250.

\* cited by examiner

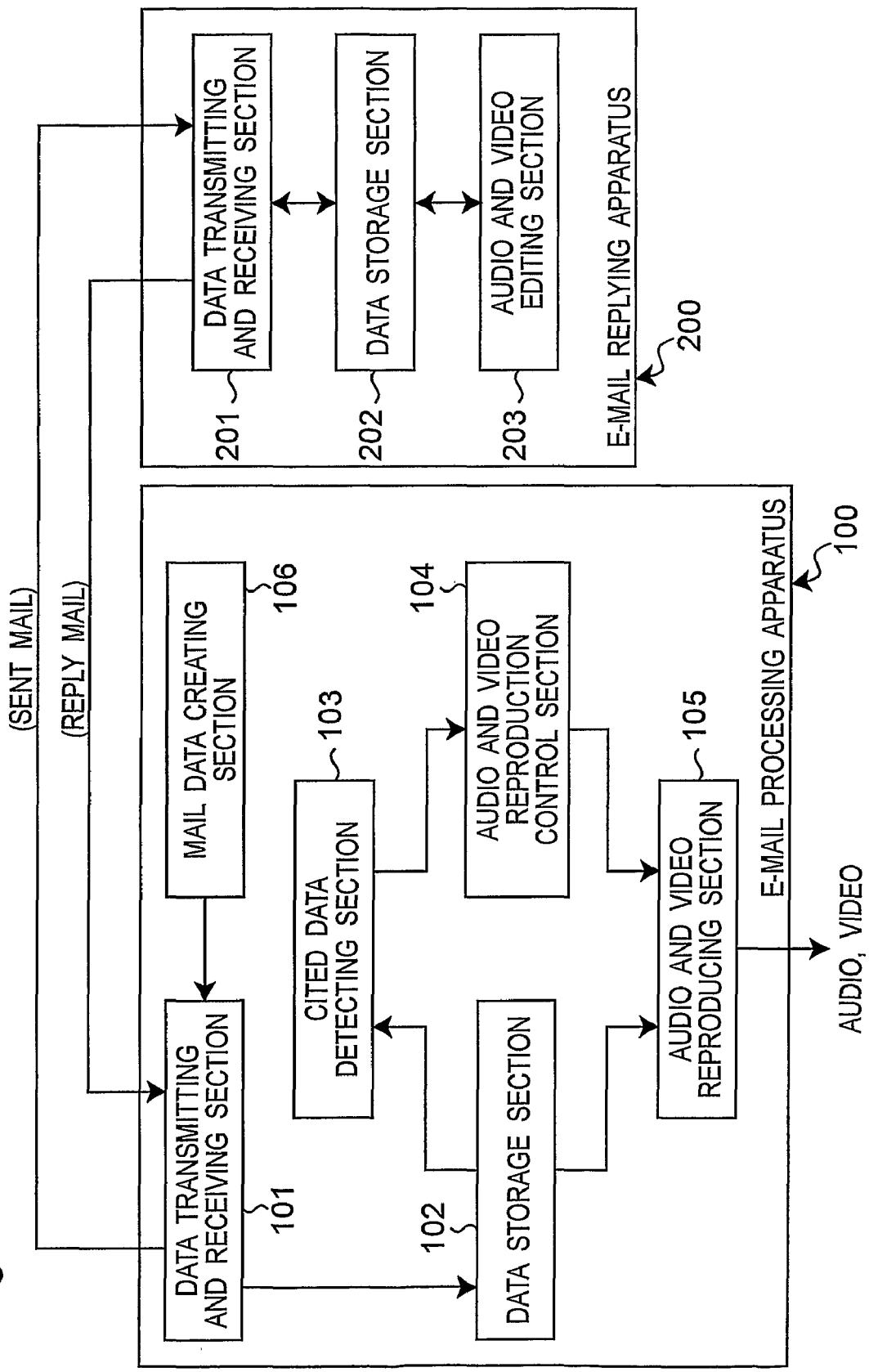

Fig.2A
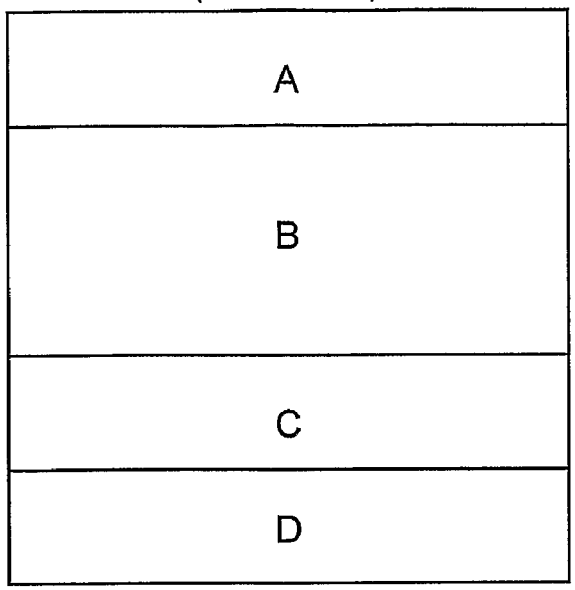
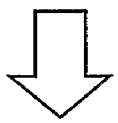
Fig.2B
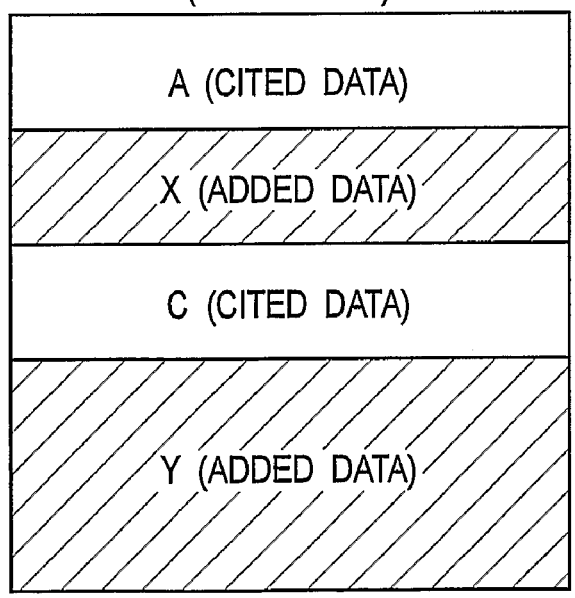

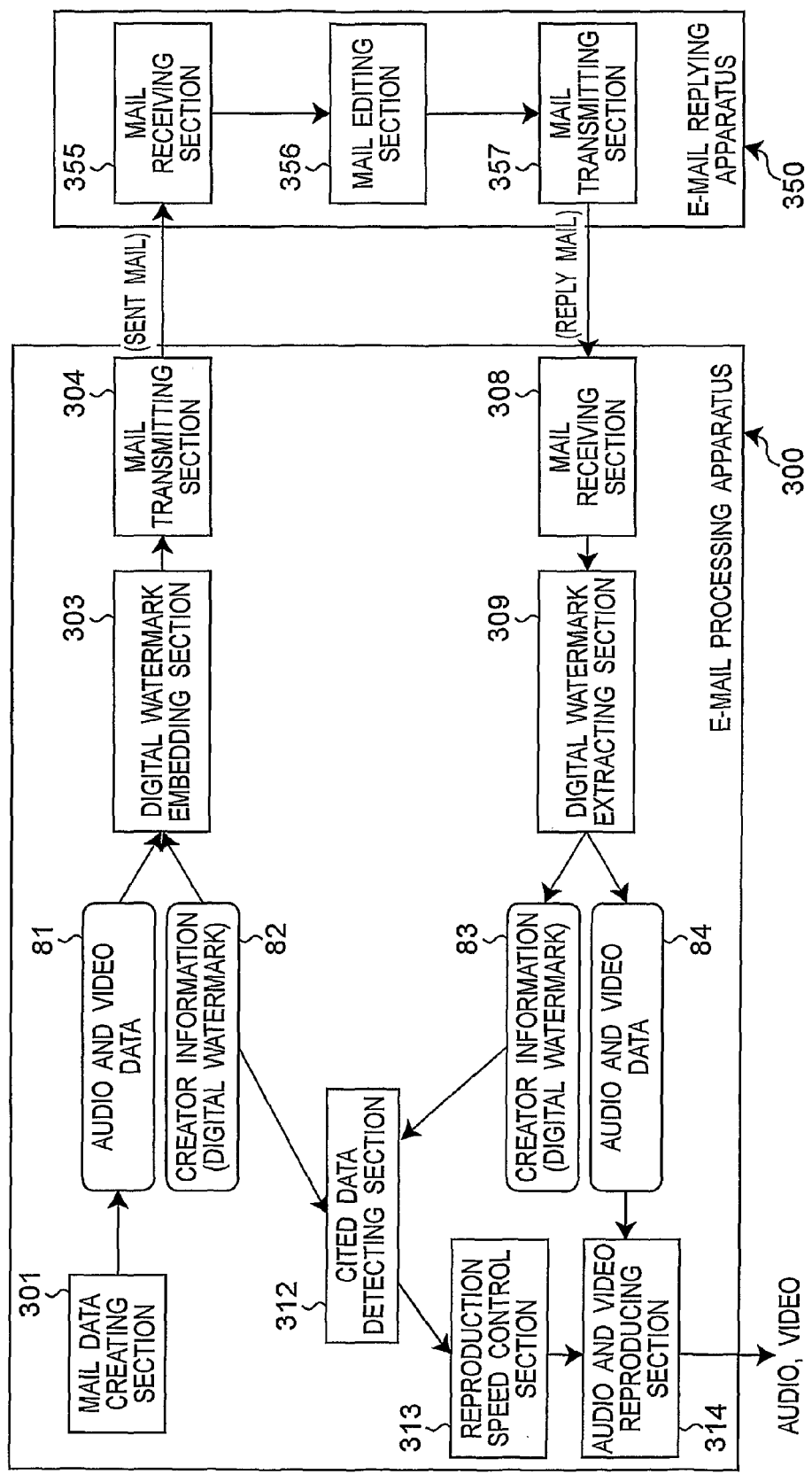

APPARATUS, SYSTEM, AND METHOD OF ELECTRONIC MAIL PROCESSING

TECHNICAL FIELD

The present invention relates to an apparatus and a method of processing electronic mail (e-mail) by video or audio data, and more particularly to reproduction technologies of a reply mail citing video or audio data of the original.

BACKGROUND ART

Recently, owing to popularity of information terminals using video and audio recording functions, electronic mails using video or audio as well as text (video mail and audio mail, respectively) are increasing aside. Generally, in exchange of electronic mails, a receiver of an electronic mail often sends a reply mail by citing a part or whole of the received mail and/or newly adding a text. In video or audio mail, a system of replying by citing a part or whole of the received video or audio mail is proposed, for example, in patent document 1.
Patent document 1: JP2000-209347

DISCLOSURE OF INVENTION

Problems to be Solved by the Invention

In the system proposed in patent document 1, the receiver of the reply mail must reproduce the video or audio data, cited in the reply mail, when reviewing the video or audio data sent from the sender in reproduction of the reply mail; the reproduction is time-consuming. In particular, since the receiver of the reply mail knows the content of the cited video or audio data, and new information is not obtained if the cited data is reproduced precisely, it is a mere waste of time. From such viewpoint, regarding the reply mail citing the video mail or audio mail, the reviewing efficiency thereof is poor for the user.

Means for Solving the Problems

The invention is devised in the light of the above problems, and it is hence an aim thereof to provide a processing apparatus and a processing method capable of reviewing the audio or video mail in the reply mail efficiently.

An electronic mail processing apparatus according to the present invention includes a data receiving section operable to receive mail data including video data or audio data, a cited data detecting section operable to detect a cited part of the received video data or audio data as cited data from the mail data received by the data receiving section, and a reproduction control section operable to control a reproducing method of the received mail data. The reproduction control section controls the reproduction method so that a reproduction method for the cited data is deferent from a reproduction method for data other than the cited data in the received mail data.

The reproduction control section may control the reproduction speed of the mail data so as to reproduce the data other than the cited data in the received mail data at a first speed, and reproduce the cited data at a second speed which is faster than the first speed.

The cited data may include information relating to a creator of the mail data in a specified region. In this case, the cited data detecting section can detect the cited portion by using the information relating to the creator.

The video data or audio data included in the cited data may be data compressed by a specified compressing method and having a header portion in which information relating to a creator of the mail data is recorded.

The cited data may include information relating to a creator of the mail data in a form of a digital watermark embedded in the video data or audio data. In this case, the cited data detecting section can detect the cited data by using the information relating to the creator embedded in a form of a digital watermark.

The electronic mail processing apparatus may further include a data creating section operable to create the mail data for transmission including video data or audio data. In this case, when creating the mail data, the data creating section stores information relating to a creator of the mail data in a specified recording region of the video data or audio data. Alternatively, the data creating section may embed information relating to a creator of the mail data in a form of a digital watermark in the video data or audio data.

An electronic mail processing method according to the present invention includes receiving mail data including video data or audio data, detecting a cited part of the video data or audio data as cited data from the received mail data, and reproducing the cited data detected from the received mail data and data other than the cited data in the received mail data in different methods.

An electronic mail processing system according to the present invention includes a first mail processing apparatus and a second mail processing apparatus which exchanges electronic mails with the first mail processing apparatus. The first mail processing apparatus includes a data transmitting and receiving section operable to transmit and receive mail data including video data or audio data, a cited data detecting section operable to detect a cited part of video data or audio data as cited data from the received mail data, a reproduction control section operable to control a reproducing method of the received mail data so that a reproduction method for the cited data is deferent from a reproduction method for data other than the cited data in the received mail data, and a data creating section operable to create mail data for transmission by adding information relating to a creator of the mail data to video data or audio data included in the mail data. The second mail processing apparatus includes a data transmitting and receiving section operable to transmit and receive mail data, and a data editing section operable to edit the mail data received in the data transmitting and receiving section. The second mail processing apparatus creates a reply mail including as cited data a part or whole of video data and audio data included in the received mail data, by the data editing section. Then it transmits a reply mail to a sender of the received mail data through the data transmitting and receiving section.

Effects of the Invention

According to the invention, when receiving and reviewing the reply mail citing the video or audio data created by the own user, it is possible to reproduce the cited portion and other portion in different reproduction methods. Hence, the cited portion can be reproduced at fast speed, while the new video or audio portion added by the sender can be reproduced at normal speed, so that the replied video or audio mail can be reviewed efficiently in a shorter time while understanding the correspondence between the original data and replied data.

BRIEF DESCRIPTION OF DRAWINGS

FIG. 1 is a block diagram of mail processing system in a first embodiment of the invention.
FIG. 2A is a diagram explaining a structure of a video mail or audio mail.

FIG. 2B is a diagram explaining the reply mail citing a part of the video or audio data.

FIG. 6 is a block diagram of an e-mail processing system in a second embodiment of the invention.

BEST MODE FOR CARRYING OUT THE INVENTION

Figure 3:
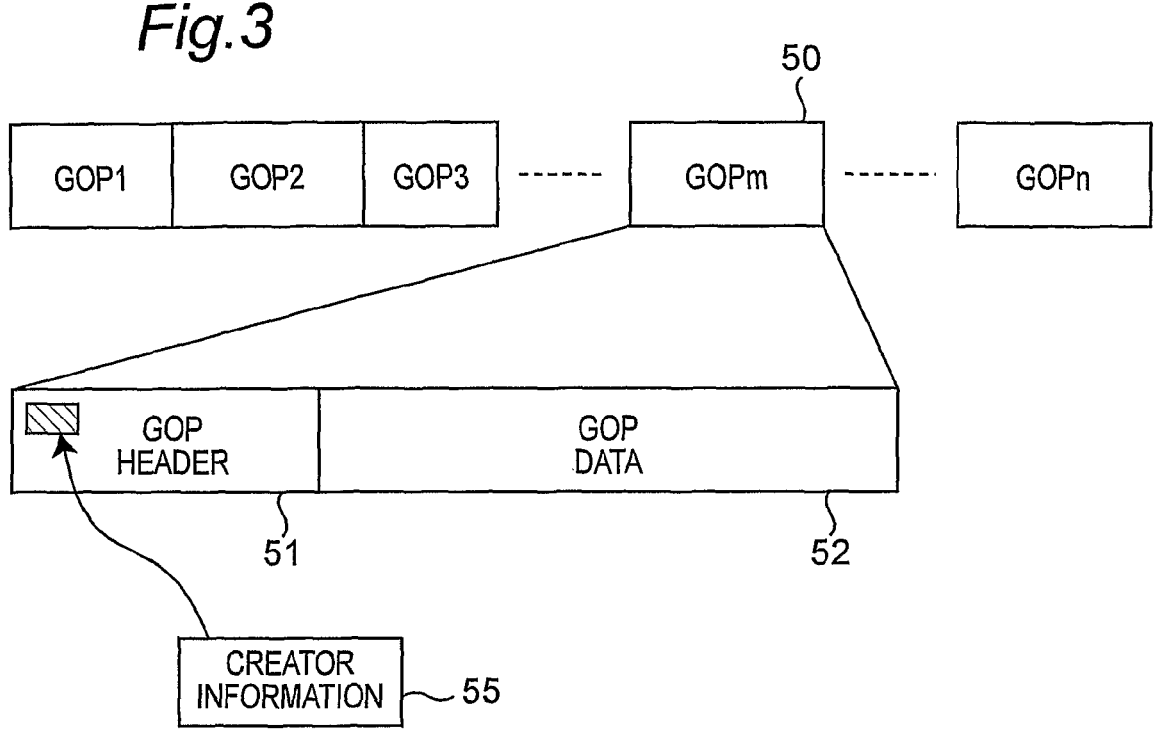
FIG. 3 is a diagram showing a structure of video data added creator information.

Preferred embodiments of the invention are described below while referring to the accompanying drawings.

First Embodiment

FIG. 1 is a block diagram of an e-mail (electronic mail) processing system in the first embodiment of the invention. The e-mail processing system includes an e-mail processing apparatus 100 and an e-mail replying apparatus 200.

The e-mail processing apparatus 100 is an apparatus for processing electronic mail expressed by video or audio (video mail or audio mail). The video mail or audio mail described here may include a mail which is composed of only video data or audio data, and a text mail to which video data or audio data is attached.

The e-mail replying apparatus 200 has a function of receiving a mail transmitted from the e-mail processing apparatus 100, and creating and transmitting a reply mail to the received mail. The e-mail replying apparatus 200 includes a data transmitting and receiving section 201, a data storage section 202, and an audio and video editing section 203. The data transmitting and receiving section 201 transmits an electronic mail to outside, and receives an electronic mail transmitted from outside. The data storage section 202, while cooperating with the data transmitting and receiving section 201, stores a part or whole of video data, audio data, data creator information, mail destination information, mail source information and user information of sent and received mails when transmitting and receiving mails. The audio and video editing section 203 creates video data or audio data newly for a reply mail by using a part or whole of the received video data and audio data stored in the data storage section 202.

When the audio and video editing section 203 creates a reply mail citing a part of the sent mail data, the cited data is directly contained in the reply mail. FIG. 2A and FIG. 2B are diagrams explaining structures of the sent mail and reply mail. For example, when the mail transmitted from the e-mail processing apparatus 100 to the e-mail replying apparatus 200 contains parts A to D of video or audio data as shown in FIG. 2A, the audio and video editing section 203 can cite data A and data C in the sent mail and insert video data or audio data X, Y after each cited date to create a reply mail, as shown in FIG. 2B.

The audio and video editing section 203 adds information (creator information) relating to a creator of the mail data to the video and audio data to be newly added in the reply mail. The creator information includes the user ID (identification information) of the reply mail creator, and device ID of the e-mail replying apparatus 200 and the other information. The details of the method of adding the creator information to the video and audio data is explained later.

Returning to FIG. 1, the details of the e-mail processing apparatus 100 is described.

The e-mail processing apparatus 100 includes a data transmitting and receiving section 101, a data storage section 102, a cited data detecting section 103, an audio and video reproduction control section 104, an audio and video reproducing section 105, and a mail data creating section 106. The e-mail processing apparatus 100 holds user information 31.

The data transmitting and receiving section 101 transmits an electronic mail from the e-mail processing apparatus 100 to outside, and receives an electronic mail transmitted to the e-mail processing apparatus 100. The mail data transmitted and received in the data transmitting and receiving section 101 includes a part or whole of video data, audio data, data creator information, mail destination information, mail source information and user information.

The data storage section 102, while cooperating with the data transmitting and receiving section 101, stores the information included in the mail data transmitted and received in the data transmitting and receiving section 101 when transmitting and receiving mail.

The mail data creating section 106 creates video and audio mail according to the user's operation. At this time, the mail data creating section 106 adds the information (creator information) relating to the creator of the mail data to the video and audio data of the video and audio mail. The creator information includes the user ID (identification information) of the mail creator, and device ID of the electronic mail transmitting processing apparatus 100 and other information. The creator information used in data creation of the sent mail is stored in a specified recording region. The details of a method of adding creator information to the video and audio data is explained later.

The cited data detecting section 103 extracts the information (creator information) relating to the data creator from the data which is received in the data transmitting and receiving section 101 and recorded in the data storage section 102, and detects the data of the cited portion (cited data) from the received mail data by using the creator information. For example, in the case of FIG. 2B, as cited data, portions of data A and data C are detected. More specifically, the cited data detecting section 103 extracts the creator information from the received data, compares the extracted creator information with the creator information added when creating the cited original mail by the mail data creating section 106, and thereby detects the cited data.

The audio and video reproduction control section 104 generates a control signal for reproducing the cited data detected by the cited data detecting section 103 at fast reproduction speed while reproducing other portion, that is, a portion newly added in the reply mail at normal reproduction speed, and sends the control signal to the audio and video reproducing section 105.

The audio and video reproducing section 105 reproduces the video and audio data of the reply mail at the reproduction speed instructed by the control signal from the audio and video reproduction control section 104.

According to this configuration, the receiver of the mail can review the reply mail citing the video and audio data of the original mail created by the own receiver while the cited portion is reproduced at fast speed and the video and audio portion newly added by the sender is reproduced at normal reproduction speed, so that the receiver can review the returned video and audio mail efficiently while understanding the correlation of the original data and reply data.

The video data or audio data included in the mail data may include not only a picture data, but also graphic data or synthetic data created by the computer and so on.

Thus, in the embodiment, by referring to the creator information extracted from the mail data received, the cited data detecting section 103 of the e-mail processing apparatus 100 detects the cited data in the reply mail. The method of adding the creator information in the data is specifically explained below.

Figure 4:
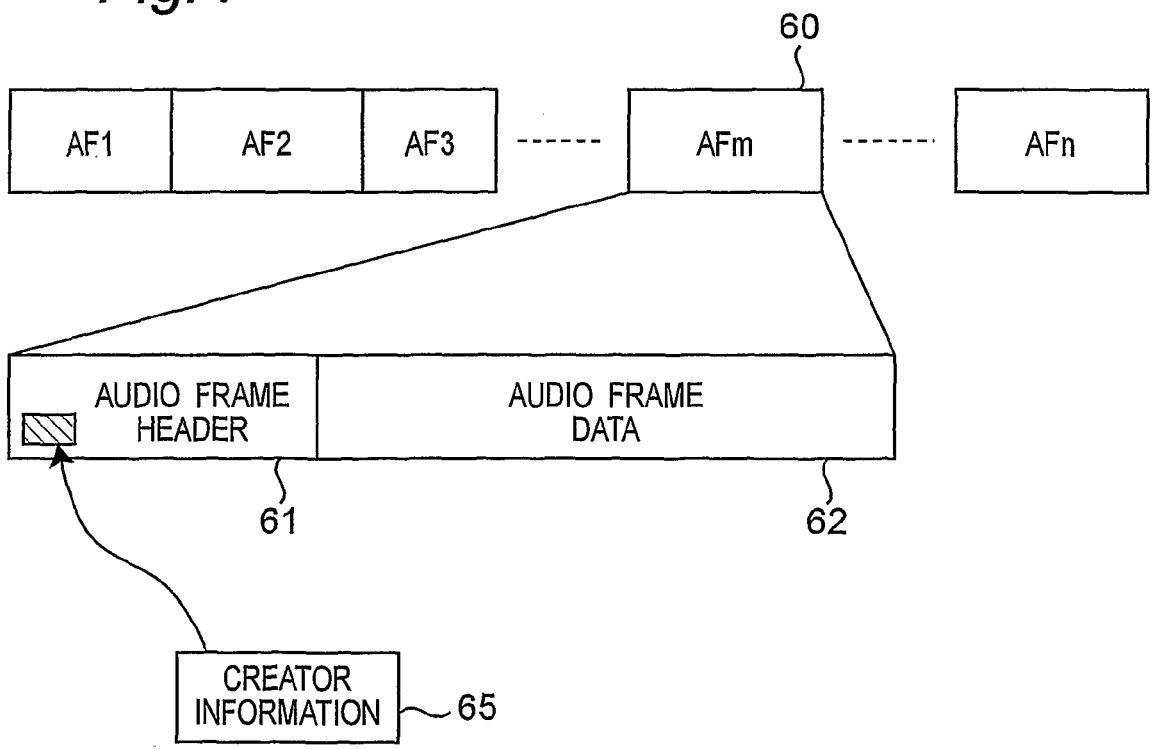
FIG. 4 is a diagram showing a structure of audio data added creator information.

FIG. 3 is a diagram showing an example of structure of video data included in the electronic mail handled in the present embodiment. FIG. 4 is a diagram showing an example of structure of audio data included in the electronic mail handled in the present embodiment. As shown in these diagrams, data creator information 55 or 65 is added to header 51 or 61 of each GOP (group of pictures) 50 of video data or each audio frame 60 of audio data.

By adding the creator information in each GOP unit or each audio frame unit, if edited in the GOP unit or audio frame unit on the reply mail editing side, that is, on the e-mail replying apparatus 200 side, the creator information of each GOP or audio frame is maintained. Hence, even when receiving video mail or audio mail edited and cited in the GOP unit or audio frame unit, the cited data detecting section 103 can correctly detect the cited portion by comparing the creator information in each GOP or audio frame with the user information.

In the present embodiment, in the GOP or audio frame, the creator information 55 or 65 is stored in each header 51 or 61, but the creator information 55 or 65 may be also stored in a part other than the header 51 or 61 of GOP or audio frame. In this case, too, as far as the creator information is recorded in each GOP or audio frame, same effects can be obtained.

In the present embodiment, an example of data having plural frames managed as one group, as represented by the GOP used in MPEG video data, is explained, but the same effects are obtained in the video data managed in one frame unit such as motion JPEG by adding the creator information to each frame data. Similarly, in the data originally managed in one frame unit such as motion JPEG, by managing plural frames as one unit and adding creator information to each management unit, the same effects are also obtained.

Figure 5A:
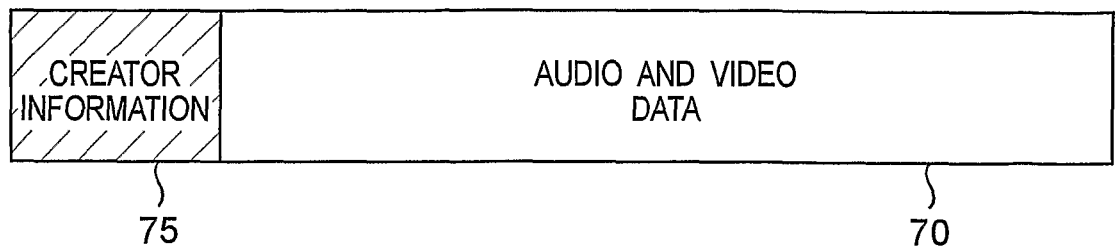
FIGS. 5A through 5C are diagrams explaining a position of creator information added to the entire video or audio data.
Figure 5B:
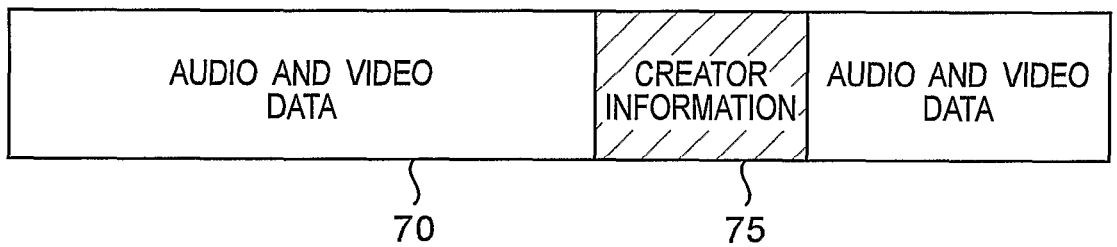
Figure 5C:
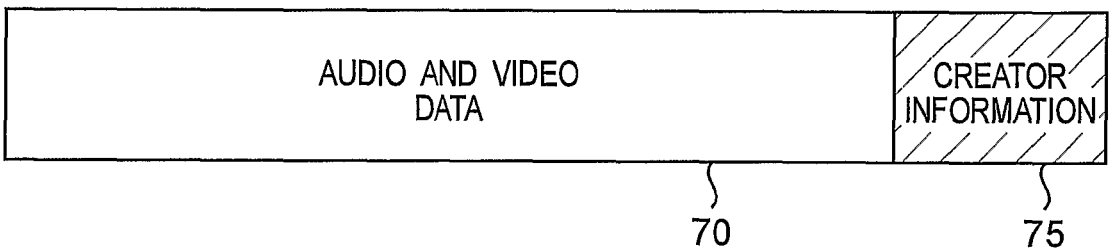

Further, as shown in FIGS. 3 and 4, instead of adding creator information to each GOP of video data or each audio frame of audio data, one piece of creator information may be added to the entire video data or audio data as shown in FIG. 5A through FIG. 5C. The position at which the creator information is added may be beginning, middle or end of video data or audio data as shown in FIG. 5A through FIG. 5C.

If unique identification information (ID) is inherently added to the video and audio data transmitted by e-mail, use of this identification information allows the cited data in the reply mail data to be detected. In this case, the e-mail processing apparatus can detect the cited data in the reply mail data without adding the creator information by managing the unique identification information added to the data of the transmitted mail.

Second Embodiment

An e-mail processing system in the present embodiment of the invention is described below. In the e-mail processing system of the present embodiment, the creator information is embedded as a digital watermark in the video and audio data transmitted as electronic mail. FIG. 6 is a block diagram of the system of this embodiment.

An e-mail processing apparatus 300 of the embodiment includes a mail data creating section 301, a digital watermark embedding section 303, a mail transmitting section 304, a mail receiving section 308, a digital watermark extracting section 309, a cited data detecting section 312, a reproduction speed control section 313, and a audio and video reproducing section 314. An e-mail replying apparatus 350 includes a mail receiving section 355, a mail editing section 356, and a mail transmitting section 357.

In the e-mail processing apparatus 300, the mail data creating section 301 creates video and audio data 81 to be transmitted as video and audio mail. The digital watermark embedding section 303 embeds creator information 82 in the video and audio data 81 as a digital watermark. The mail transmitting section 304 transmits the video and audio data with embedded digital watermark.

The data transmitted from the mail transmitting section 304 is received in the mail receiving section 355 of the e-mail replying apparatus 350. A reply mail is then created in the mail editing section 356 by citing a part or whole of the video and audio data. The data for reply mail created in the mail editing section 356 is returned to the e-mail processing apparatus 300 through the mail transmitting section 357.

The mail returned from the mail transmitting section 357 is received in the mail receiving section 308 of the e-mail processing apparatus 300, and the creator information 83 is extracted by the digital watermark extracting section 309, and video and audio data 84 is obtained.

The extracted creator information 83 is compared with the creator information 82 of the original data in the cited data detecting section 312. Based on the result of comparison, data portion with the extracted creator information 83 equal to creator information 82 of the original data is extracted as cited data. The reproduction speed control section 313, by using the information extracted by the cited data detecting section 312, creates reproduction speed control data for the video and audio data 311. That is, the reproduction speed control data is created to instruct reproduction speed so that the data of the cited portion is reproduced at fast speed, while the data of other than cited portion is reproduced at normal speed. According to this reproduction speed control data, the audio and video reproducing section 314 reproduces the video and audio data 311.

As described above, even though the data format is converted by compression or decompression of data in the mail editing section 306 of the e-mail replying apparatus 350, embedding the creator information as a digital watermark allows the cited portion to be extracted correctly in the cited data detecting section 312.

In the foregoing embodiments, any arbitrary information (for example, identification information added to each data) may be used as the creator information as far as the cited portion and other newly added portion can be distinguished in the reply mail.

In the preceding embodiments, the reproduction speed is different between the cited data portion and newly added portion in the reply mail. Instead, the reproduction method may be distinct in other respects than the reproduction speed. For example, in the cited data portion, instead of reproducing the whole cited data, only a specific beginning portion of the cited data may be reproduced.

INDUSTRIAL APPLICABILITY

According to the invention, the reproduction method may be varied between the cited portion data and newly added portion data in the reply mail, and only the cited portion data can be reproduced at fast speed, and therefore the viewing efficiency of reply mail can be enhanced, and it is very useful for receiving apparatus of video or audio electronic mail.

The invention is described so far by referring to preferred embodiments, but other changes, modifications and applications are apparent for those skilled in the art. Hence the invention is not limited by the illustrated embodiments alone, but should be limited by the scope of the claims being appended. The present invention relates to Japanese Patent Application No. 2003-429445 (filed Dec. 25, 2003), the contents of which are incorporated herein by reference.

The invention claimed is:

1. An electronic mail processing apparatus comprising:
a data receiving section operable to receive mail data including video data or audio data;
a cited data detecting section operable to detect a cited part of the received video data or audio data that is cited from mail data created by a creator different from a creator of the received mail, as cited data, from the mail data received by the data receiving section; and
a reproduction control section operable to control a reproducing method of the received mail data based on the detection result by the cited data detecting section,
wherein the reproduction control section controls the reproduction method so that a reproduction method for the cited data which is detected by the cited data detecting section is different from a reproduction method for data other than the cited data which is detected by the cited data detecting section in the received mail data,
wherein the video data or audio data included in the cited data is data compressed by a specified compressing method and has a frame including a header portion in which information relating to the creator of the mail data is recorded, and
wherein the cited data detecting section detects the cited part by using the information relating to the creator recorded in the header portion of the frame of the video data or audio data.

2. The electronic mail processing apparatus according to claim 1, wherein the reproduction control section controls reproduction speed of the mail data so as to reproduce the data other than the cited data in the received mail data at a first speed, and reproduce the cited data at a second speed which is faster than the first speed.

3. The electronic mail processing apparatus according to claim 1, wherein the cited data includes the information relating to the creator of the mail data in a form of a digital watermark embedded in the video data or audio data, and the cited data detecting section detects the cited data by using the information relating to the creator embedded in the form of the digital watermark.

4. The electronic mail processing apparatus according to claim 1, further comprising:
a data creating section operable to create the mail data for transmission including the video data or audio data,
wherein when creating the mail data, the data creating section stores the information relating to the creator of the mail data in the header portion of the frame of the video data or audio data.

5. The electronic mail processing apparatus according to claim 1, further comprising:
a data creating section operable to create the mail data for transmission including the video data or audio data,
wherein when creating the mail data, the data creating section embeds the information relating to the creator of the mail data in a form of a digital watermark in the video data or audio data.

6. An electronic mail processing method comprising:
receiving mail data including video data or audio data;
detecting a cited part of the video data or audio data that is cited from mail data created by a creator different from a creator of the received mail, as cited data, from the received mail data; and
making a reproduction method for the mail data such that different reproduction methods are used for a case in which data to be reproduced is the detected cited part and a case in which the data to be reproduced is data which is another part than the detected cited part,
wherein the video data or audio data included in the cited data is data compressed by a specified compressing method and has a frame including header portion in which information relating to the creator of the mail data is recorded, and
wherein the cited data is detected by using the information relating to the creator that is recorded in the header portion of the frame of the video data or audio data.

7. The electronic mail processing method according to claim 6, wherein the data other than the cited data in the received mail data is reproduced at a first speed, and the cited data is reproduced at a second speed which is faster than the first speed.

8. The electronic mail processing method according to claim 6, wherein the cited data includes the information relating to the creator of the mail data in a form of a digital watermark embedded in the video data or audio data, and the cited data is detected by using the information relating to the creator embedded in the form of the digital watermark.

9. The electronic mail processing method according to claim 6, further comprising:
creating mail data including video data or audio data,
storing the information relating to a creator of the created mail data in the header portion of the frame of video data or audio data, and
transmitting the created mail data having the information relating to the creator stored therein.

10. The electronic mail processing method according to claim 6, further comprising:
creating mail data including video data or audio data,
embedding the information relating to a creator of the created mail data in a form of a digital watermark in the video data or audio data, and
transmitting the created mail data embedded with the information relating to the creator.

11. An electronic mail processing system comprising:
a first mail processing apparatus; and
a second mail processing apparatus that exchanges electronic mails with the first mail processing apparatus,
wherein the first mail processing apparatus comprises:
a data transmitting and receiving section operable to transmit and receive mail data including video data or audio data;
a cited data detecting section operable to detect a cited part of video data or audio data that is cited from mail data created by a creator different from a creator of the received mail, as cited data, from the received mail data;
a reproduction control section operable to control a reproducing method of the received mail data based on the detection result by the cited data detecting section so that a reproduction method for the cited data which is detected by the cited data detecting section is different from a reproduction method for data other than the cited data which is detected by the cited data detecting section in the received mail data; and a data creating section operable to create mail data for transmission by adding information relating to a creator of the mail data to video data or audio data included in the mail data, wherein the video data or audio data included in the cited data is data compressed by a specified compressing method and has a frame including a header portion in which information relating to the creator of the mail data is recorded, wherein the cited data detecting section detects the cited part by using the information relating to the creator that is recorded in the header portion of the frame of the video data or audio data, and wherein the second mail processing apparatus comprises:
  a data transmitting and receiving section operable to transmit and receive mail data; and
  a data editing section operable to edit the mail data received in the data transmitting and receiving section, and wherein the second mail processing apparatus creates a reply mail including as cited data a part or whole of video data and audio data included in the received mail data, by the data editing section, and transmits a reply mail to a sender of the received mail data through the data transmitting and receiving section.

\* \* \* \* \*